US011122405B2

(12) United States Patent
Zhang et al.

(10) Patent No.: US 11,122,405 B2
(45) Date of Patent: Sep. 14, 2021

(54) MTC KEY MANAGEMENT FOR KEY DERIVATION AT BOTH UE AND NETWORK

(71) Applicant: NEC CORPORATION, Tokyo (JP)

(72) Inventors: Xiaowei Zhang, Tokyo (JP); Anand Raghawa Prasad, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/444,517

(22) Filed: Jun. 18, 2019

(65) Prior Publication Data
US 2019/0306684 A1    Oct. 3, 2019

Related U.S. Application Data

(63) Continuation of application No. 14/652,456, filed as application No. PCT/JP2014/000015 on Jan. 7, 2014, now abandoned.

(30) Foreign Application Priority Data

Jan. 10, 2013 (JP) .................................. 2013-002981

(51) Int. Cl.
*H04W 4/70* (2018.01)
*H04W 12/041* (2021.01)
(Continued)

(52) U.S. Cl.
CPC ............. *H04W 4/70* (2018.02); *H04W 12/03* (2021.01); *H04W 12/041* (2021.01); *H04W 12/0433* (2021.01); *H04L 2463/081* (2013.01)

(58) Field of Classification Search
CPC .......... H04W 12/03–0433; H04W 4/70; H04L 9/08–0844; H04L 63/06–068; H04L 2463/081
See application file for complete search history.

(56) References Cited

U.S. PATENT DOCUMENTS 8,116,775 B2    2/2012 Choi et al.
9,031,535 B2    5/2015 Wass
(Continued)

FOREIGN PATENT DOCUMENTS

EP          1613116 A1    1/2006
KR    10-2011-0078627 A    7/2011
(Continued)

OTHER PUBLICATIONS

Mun, Hyeran, Kyusuk Han, and Kwangjo Kim. "3G-WLAN interworking: security analysis and new authentication and key agreement based on EAP-AKA." 2009 Wireless Telecommunications Symposium. IEEE, 2009. (Year: 2009).*

(Continued)

*Primary Examiner* — Madhuri R Herzog

(57) ABSTRACT

There is provided a new IWF SMC procedure for establishing security association between an MTC UE (10) and an MTC-IWF (20). The MTC-IWF (20) sends to the UE (10) at least an algorithm identifier which instructs the UE (10) to select one of algorithms for deriving a root key (K_iwf). The UE (10) derives the root key (K_iwf) in accordance with the selected algorithm, and derives at least a subkey for checking the integrity of messages transferred between the UE (10) and the MTC-IWF (20) by using the derived root key (K_iwf). The UE (10) protects uplink messages transmitted to the MTC-IWF (20) with the derived subkey. The MTC-IWF (20) protects downlink messages transmitted to the UE (10) with the same subkey derived at a core network.

12 Claims, 5 Drawing Sheets

(51) Int. Cl.
  *H04W 12/0433* (2021.01)
  *H04W 12/03* (2021.01)

(56) References Cited

U.S. PATENT DOCUMENTS

| | | | |
|---|---|---|---|
| 2005/0232429 A1* | 10/2005 | Chowdhury | H04L 63/061 380/277 |
| 2009/0186601 A1* | 7/2009 | Hahn | H04W 12/043 455/411 |
| 2010/0095123 A1 | 4/2010 | He | |
| 2010/0159882 A1 | 6/2010 | He | |
| 2010/0291933 A1 | 11/2010 | Choi et al. | |
| 2011/0004762 A1* | 1/2011 | Horn | H04W 12/04031 713/171 |
| 2011/0314287 A1* | 12/2011 | Escott | H04L 63/061 713/171 |
| 2012/0207094 A1 | 8/2012 | Liao | |
| 2012/0263298 A1 | 10/2012 | Suh et al. | |
| 2012/0297193 A1 | 11/2012 | Liu et al. | |
| 2014/0038549 A1 | 2/2014 | Lehane et al. | |
| 2015/0172909 A1 | 6/2015 | Chandramouli et al. | |
| 2015/0257003 A1* | 9/2015 | Norrman | H04W 12/06 713/171 |
| 2017/0257843 A1 | 9/2017 | Wang et al. | |

FOREIGN PATENT DOCUMENTS

| | | |
|---|---|---|
| KR | 10-2012-0094454 A | 8/2012 |
| WO | 2011/085810 A1 | 7/2011 |

OTHER PUBLICATIONS

Sankaran, C. B. "Network access security in next-generation 3GPP systems: A tutorial." IEEE Communications Magazine 47.2 (2009): 84-91. (Year: 2009).*
3GPP TR 33.868; 3rd Generation Partnership Project; Technical Specification Group Services and System Aspect; "Security aspects of Machine-Type and other Mobile Data Applications Communications Enhancements; (Release 12)", V0.10.0, Sep. 2012, pp. 1-55.
3GPP TS 33.401; 3rd Generation Partnership Project; Technical Specification Group Services and System Aspects; "3GPP System Architecture Evolution (SAE); Security Architecture (Release 12)", V12.5.1, Oct. 2012; pp. 1-21.
International Search Report, dated Apr. 2, 2014, from corresponding PCT application No. PCT/JP2014/000015.
Japanese Official Action, dated Feb. 23, 2016, JP Application No. 2015-538835.
NEC Corporation, pCR Secure Trigger Delivery with Security Association between MTC-IWF and UE, 3GPP TSG SA WG3 (Security) Meeting #69, Nov. 5-9, 2012; Edinburgh, Scotland, S3-121117, revision of S3-12abcd. pp. 1-7.
Samsung, Solutions for Group based messaging using cell broadcast, 3GPP TSG SA WG3 (Security) Meeting #69, Nov. 5-9, 2012; Edinburgh, United Kingdom, S3-121114, revision of 53-121abcd pp. 1-2.
3GPP TR 33.868, 3rd Generation Partnership Project; Technical Specification Group Services and System Aspects, Security aspects of Machine-Type and other Mobile Data Applications Communications Enhancements; (Release 12), vo.11.0 (Nov. 2012), pp. 1-63.
Samsung, Solutions for Group based messaging using cell broadcast, 3GPP TSG SA WG3 (Security) Meeting #69, Nov. 5-9, 2012; Edinburgh, United Kingdom, S3-121182, revision of S3-12114, pp. 1-2.
NEC Corporation, Secure Trigger Delivery with Security Associations between MTC-IWF and UE, 3GPP TSG SA WG3 (Security) Meeting #69, Nov. 5-9, 2012; Edinburgh, Scotland, S3-121116, revision of S3-12abcd, pp. 1-2.
NEC Corporation, pCR Secure Trigger Delivery with Security Association between MTC-IWF and UE, 3GPP TSG SA WG3 (Security) Meeting #69, Nov. 5-9, 2012; Edinburgh, Scotland, S3-121175, revision of S3-12abcd, pp. 1-7.
Korean Official Action, dated Jun. 28, 2017, KR Application No. 10-2015-7021336.
Korean Official Action, dated Feb. 26, 2018, KR Application No. 10-2017-7034893.
"3rd Generation Partnership Project; Technical Specification Group Services and System Aspect; Architecture enhancement to facilitate communications with packet data networks and applications (Release 11)", 3GPP Standards; 3GPP TS 23.682, V11.1.0, Jun. 2012 (Jun. 30, 2012).
Jain et al. "Machine Type Communications in 3GPP Systems", IEEE Communications Magazine, Nov. 2012, vol. 50, Issue 11, pp. 28-35.

* cited by examiner

MTC KEY MANAGEMENT FOR KEY DERIVATION AT BOTH UE AND NETWORK

TECHNICAL FIELD

The present invention relates to key management in MTC (Machine-Type Communication) system, in particular to a technique to derive a key at both of a UE (User Equipment) and a network.

BACKGROUND ART

As disclosed in NPL 1, the security over the interface between an MTC device and an MTC-IWF (MTC Inter-Working Function) should be studied.

Note that the MTC device is a UE equipped for MTC, which will be sometimes referred to as "MTC UE" or "UE" in the following explanation.

CITATION LIST

Non Patent Literature

NPL 1: 3GPP TR 33.868, "Security aspects of Machine-Type and other Mobile Data Applications Communications Enhancements; (Release 12)", V0.10.0, 2012-09

NPL 2: 3GPP TS 33.401, "3GPP System Architecture Evolution (SAE); Security architecture (Release 12)", V12.5.1, 2012-10

SUMMARY OF INVENTION

Technical Problem

However, in 3GPP (3rd Generation Partnership Project), the study has not been fulfilled. Therefore, secure communication solution is required between an MTC device and an MTC-IWF.

Accordingly, an exemplary object of the present invention is to ensure secure communication between an MTC device and an MTC-IWF.

Solution to Problem

In order to achieve the above-mentioned object, this invention deals with the following issues:

Deriving the same root key at both UE and network side.

In this invention, there is proposed that network and UE derive the root key K_iwf separately. There is no key sent between them. Key derivation parameters can be either sent from network to UE or from UE to network. Inside the core network, the key derivation parameters can be sent from HSS (Home Subscriber Server) to MTC-IWF and MME (Mobility Management Entity), or from MTC-IWF to HSS or MME. The derivation algorithms are available in the UE and the network node. Network indicates UE which algorithm should be used for root key derivation by using an algorithm identifier.

There is also proposed a new IWF Security Mode Command (SMC) procedure for the security association establishment between UE and MTC-IWF.

A communication system according to a first aspect of the present invention includes: an MTC-IWF; and a UE. The MTC-IWF stores a master key, derives subkeys for confidentiality and integrity protection, and informs the UE about an algorithm for key derivation. The UE derives, by using the algorithm, the master key and the subkeys such that the UE shares the same master key and the same subkeys with the MTC-IWF. Security association is established between the UE and the MTC-IWF by using the shared master key and subkeys.

An MTC-IWF according to a second aspect of the present invention is configured to store a master key, derive subkeys for confidentiality and integrity protection, and inform a UE about an algorithm for key derivation to cause the UE to derive the master key and the subkeys such that the UE shares the same master key and the same subkeys with the MTC-IWF. Security association is established between the UE and the MTC-IWF by using the shared master key and subkeys.

A UE according to a third aspect of the present invention is configured to derive, by using an algorithm for key derivation informed from an MTC-IWF, a master key and subkeys for confidentiality and integrity protection such that the UE shares the master key and the subkeys with the MTC-IWF. Security association is established between the UE and the MTC-IWF by using the shared master key and subkeys.

An HSS according to a fourth aspect of the present invention is configured to derive a master key, and to send the master key to an MTC-IWF. The master key is shared between the MTC-IWF and a UE, and used for establishing security association between the MTC-IWF and the UE.

An MME according to a fifth aspect of the present invention is configured to carry, to a UE, a NAS SMC message that includes an IWF SMC message for informing the UE about an algorithm for key derivation. The algorithm is used for the UE and an MTC-IWF to share a master key and subkeys for confidentiality and integrity protection, and security association is established between the UE and the MTC-IWF by using the shared master key and subkeys.

A method according to a sixth aspect of the present invention provides a method of securing MTC communication. This method includes: storing, by an MTC-IWF, a master key; deriving, by the MTC-IWF, subkeys for confidentiality and integrity protection; informing, by the MTC-IWF, a UE about an algorithm for key derivation; and deriving, by the UE using the algorithm, the master key and the subkeys such that the UE shares the same master key and the same subkeys with the MTC-IWF. Security association is established between the UE and the MTC-IWF by using the shared master key and subkeys.

Advantageous Effects of Invention

According to the present invention, it is possible to solve the above-mentioned problems, and thus to ensure secure communication between an MTC device and an MTC-IWF.

DESCRIPTION OF EMBODIMENTS

Hereinafter, an exemplary embodiment of the present invention will be described with the accompany drawings.

Figure 1:
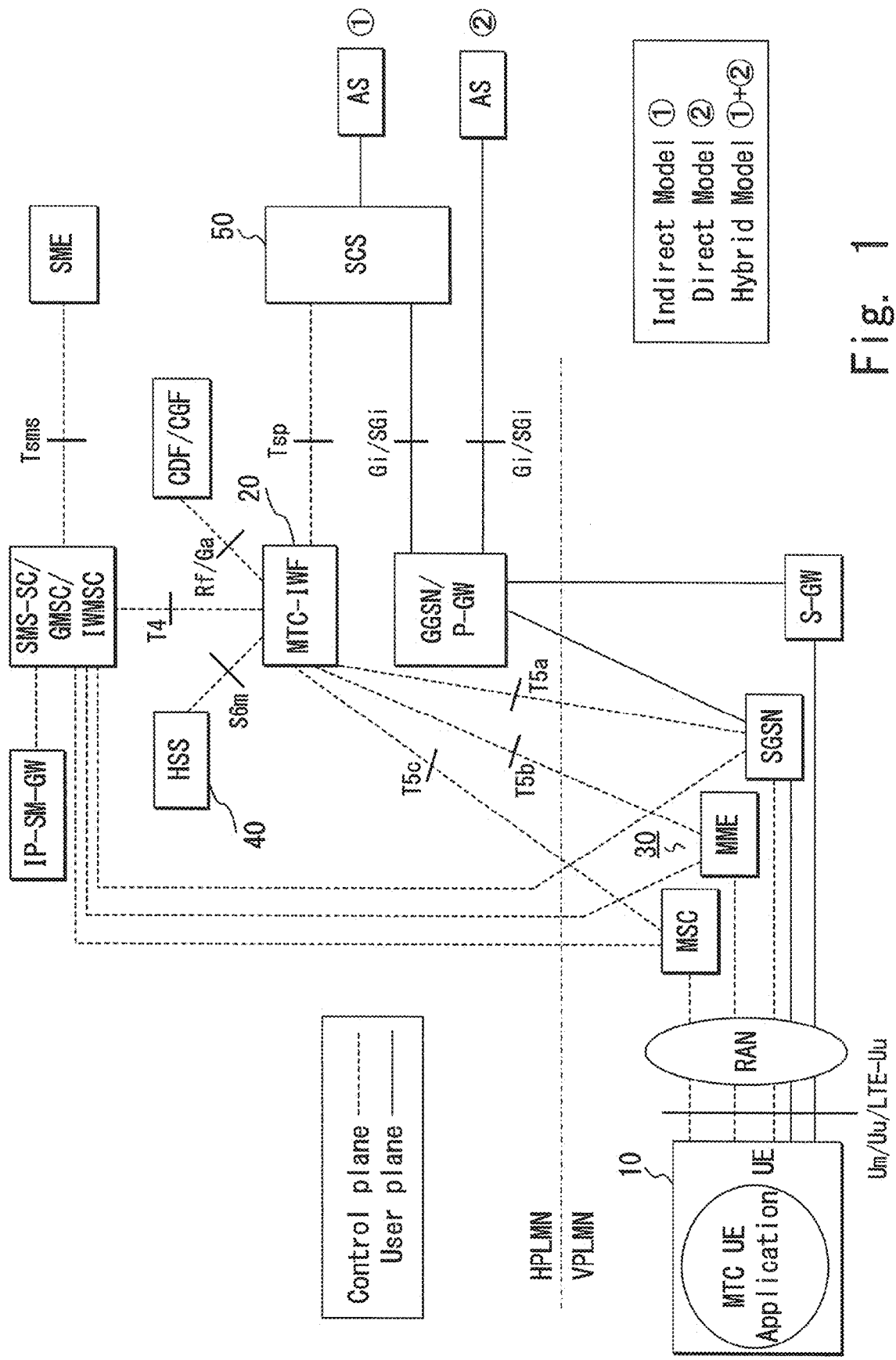
FIG. 1 is a block diagram showing a configuration example of a communication system according to an exemplary embodiment of the present invention.

As shown in FIG. 1, a communication system according to this exemplary embodiment includes a core network (3GPP network), and one or more MTC UEs 10 which are UEs equipped for MTC and connect to the core network through a RAN (Radio Access Network). While the illustration is omitted, the RAN is formed by a plurality of base stations (i.e., eNBs (evolved Node Bs)).

The MTC UE 10 attaches to the core network. The MTC UE 10 can host one or multiple MTC Applications. The corresponding MTC Applications in the external network are hosted on an SCS (Service Capability Server) 50. The SCS 50 connects to the core network to communicate with the MTC UE 10.

Further, the core network includes an MTC-IWF 20 as one of its network nodes. The MTC-IWF 20 serves as a gateway to the core network for the SCS 50. The MTC-IWF 20 relays messages between the MTC UE 10 and the SCS 50. The core network includes, as other network nodes, an HSS (Home Subscriber Server) 40, an MME, an SGSN (Serving GPRS (General Packet Radio Service) Support Node), an MSC (Mobile Switching Centre) and the like. In the following description, the MME and the SGSN are sometimes referred to as "MME/SGSN", and collectively or individually denoted by the symbol 30. Communication between the MTC UE 10 and the MTC-IWF 20 is conducted through the MME/SGSN 30 (or the MSC).

Next, operation examples of this exemplary embodiment will be described in detail with reference to FIGS. 2 to 4.

1. IWF SMC Procedure

Figure 2:
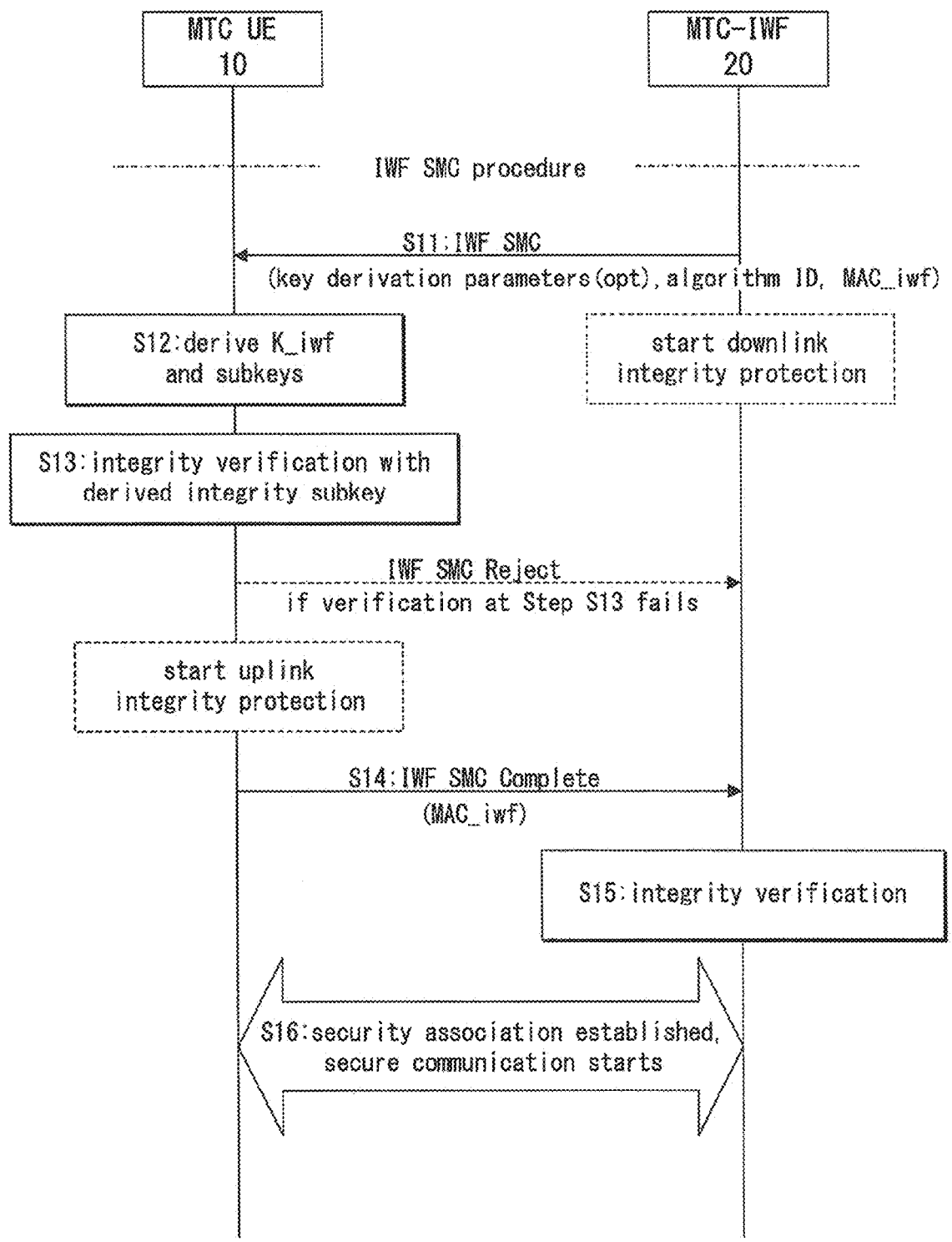
FIG. 2 is a sequence diagram showing one example of IWF SMC procedure in the communication system according to the exemplary embodiment.

FIG. 2 shows IWF SMC procedure using SAE/LTE (Long Term Evolution) NAS (Non Access Stratum) SMC mechanism for establishing security association between UE 10 and MTC-IWF 20. This procedure will be described below.

Assume that MTC-IWF 20 has either received or derived the root key K_iwf and has derived subkeys. Note that the root key K_iwf is used for deriving the subkeys. The subkeys include at least an integrity key for checking the integrity of messages transferred between the MTC UE 10 and the MTC-IWF 20 (hereinafter, this key will be referred to as "integrity subkey"). The subkeys may also include a confidentiality key for encrypting and decrypting messages transferred between the MTC UE 10 and the MTC-IWF 20.

S11: MTC-IWF 20 sends IWF SMC message to UE 10, with key derivation parameters (optional) and algorithm ID. The IWF SMC message is protected by the integrity subkey. Integrity protection at downlink is started.

S12: UE 10 derives K_iwf and subkeys, by using the key derivation parameters and algorithm sent from MTC-IWF 20.

S13: UE 10 verifies the received IWF SMC message with the derived integrity subkey. Integrity protection at uplink is started. UE 10 sends IWF SMC Reject message if the verification fails.

S14: If the integrity verification is successful, UE 10 sends IWF SMC Complete message to MTC-IWF 20 with integrity protection by using the integrity subkey that UE 10 has derived. Uplink integrity protection is started.

S15: MTC-IWF 20 verifies the IWF SMC Complete message with integrity subkey it has derived.

S16: If the verification at Step S15 is successful, the security association is established between UE 10 and MTC-IWF 20 and they can start secure communication.

Figure 3:
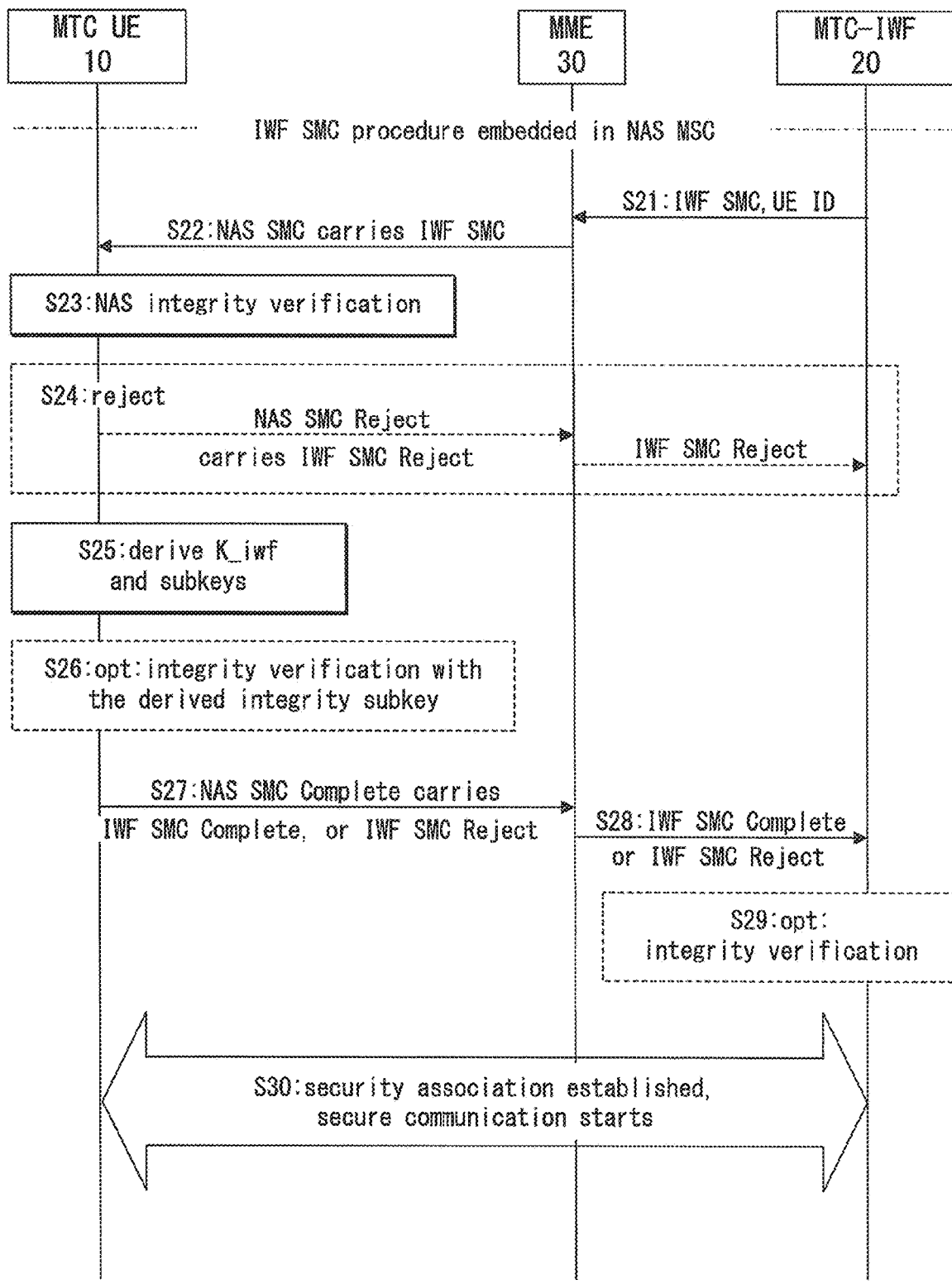
FIG. 3 is a sequence diagram showing another example of the IWF SMC procedure in a case where IWF SMC is carried in NAS SMC.

Meanwhile, as shown in FIG. 3, IWF SMC messages can also be carried in NAS SMC procedure.

S21: MTC-IWF 20 sends integrity protected IWF SMC message (same as Step S11 in FIG. 2) or the necessary parameters for UE 10 to perform key derivation, with UE ID to MME 30.

S22: MME 30 carries the IWF SMC message with NAS SMC message and sends it to UE 10.

S23: UE 10 performs NAS integrity verification.

S24: If NAS integrity verification fails, UE 10 sends NAS SMC Reject message carrying IWF SMC Reject message to MME 30. MME 30 forwards the IWF SMC Reject message to MTC-IWF 20.

S25: If NAS integrity verification is succeed, UE 10 derives K_iwf and subkeys.

S26: UE 10 performs integrity verification on the IWF SMC, if the IWF SMC message was sent at Step S21 with integrity protection. The integrity verification is by using the integrity subkey derived by UE 10.

S27: UE 10 sends the NAS SMC Complete carrying IWF SMC Complete to MME 30. The IWF SMC Complete message can be integrity protected.

Or UE 10 sends IWF SMC Reject message carried in NAS SMC Complete, if the verification at Step S26 fails.

S28: MME 30 forwards the IWF SMC Complete or IWF SMC Reject message to MTC-IWF 20.

S29: MTC-IWF 20 performs integrity verification on the IWF SMC Complete message, if it was integrity protected.

S30: Security association is established between UE 10 and MTC-IWF 20 and they can start secure communication. If MTC-IWF 20 received IWF SMC Complete, and integrity verification is passed at Step S29 (when it is carried).

In this procedure, the integrity protection for IWF SMC message is by integrity subkey, NAS SMC message protection and verification follows the requirement in NPL 2.

2. Root Key Derivation at Both Network and UE

The initial key derivation at both sides of the UE and the core network can be triggered by:

Attaching of a MTC capable UE to the network where the UE does not have K_iwf yet, and network verifies it is a MTC UE;

First time there is a trigger need to be delivered to UE and no security association exists between the UE and MTC-IWF.

In this exemplary embodiment, take as an example a case where communication is initiated by trigger from SCS 50. The details are shown in FIG. 4.

S31: Assume that security between HSS 40 and MTC-IWF 20 has been established.

S32: SCS 50 sends MTC device trigger message to MTC-IWF 20, including target UE ID.

S33: MTC-IWF 20 sends Subscriber Information Request message to HSS 40 with msg type=trigger and UE ID. The msg type is to indicate HSS 40 that the request from SCS 50 is trigger.

S34: Mutual authentication with UE 10 is carried if UE 10 has not been authenticated yet.

S35: As an option, UE 10 can send some key derivation parameters to network in NAS message.

In a case where MTC-IWF 20 derives K_iwf, the following Steps S36 to S38 are performed.

S36: If MTC-IWF 20 does not have the key derivation parameters itself, HSS 40 can send them to MTC-IWF 20 in Subscriber Information Response message.

S37: MTC-IWF 20 derives K_iwf and subkeys accordingly.

S38: IWF SMC procedure is carried, either as an independent procedure as shown in FIG. 2 or embedded in NAS SMS procedure as shown in FIG. 3.

Alternatively, in a case where HSS 40 derives K_iwf, the following Steps S46 to S48 are performed.

S46: HSS 40 derives the K_iwf. If MTC-IWF 20 has the key derivation parameters, it can send it to HSS 40 at Step S33.

S47: HSS 40 sends K_iwf to MTC-IWF 20 in Subscriber Information Response message.

S48: MTC-IWF 20 stores K_iwf and derives subkeys.

S49: IWF SMC procedure is carried, either as an independent procedure or embedded in NAS SMS procedure.

Alternatively, in a case where MME 30 derives K_iwf, the following Steps S56 to S60 are performed.

S56: HSS 40 sends the key derivation parameters, algorithm ID to MME 30 in Authentication data response or Insert Subscriber Data.

S57: MME 30 derives K_iwf.

S58: MME 30 sends the derived K_iwf to MTC-IWF 20, in any one of the following two ways, for example.

One way is that MME 30 sends K_iwf in a new message to HSS 40, then HSS 40 sends it to MTC-IWF 20 in a new message called Update Subscriber Information message.

The other way is that MME 30 directly sends K_iwf over interface T5 in a new message or in a Report message to MTC-IWF 20.

S59: MTC-IWF 20 will store the K_iwf and derives the subkeys.

S60: IWF SMC procedure is carried, either as an independent procedure or embedded in NAS SMS procedure.

The IWF SMC procedure is the same for the case where UE 10 initiates communication. At Step S36 and Step S47, the above-mentioned Update Subscriber Information can be used for HSS 40 to send key derivation parameter or K_iwf.

Next, configuration examples of the MTC UE 10 and the MTC-IWF 20 according to this exemplary embodiment will be described with reference to FIGS. 5 and 6. Note that in the following explanation, there will be described only elements which are specific to this exemplary embodiment. However, it will be understood that the MTC UE 10 and the MTC-IWF 20 also include elements for functioning as typical MTC UE and MTC-IWF, respectively.

Figure 4:
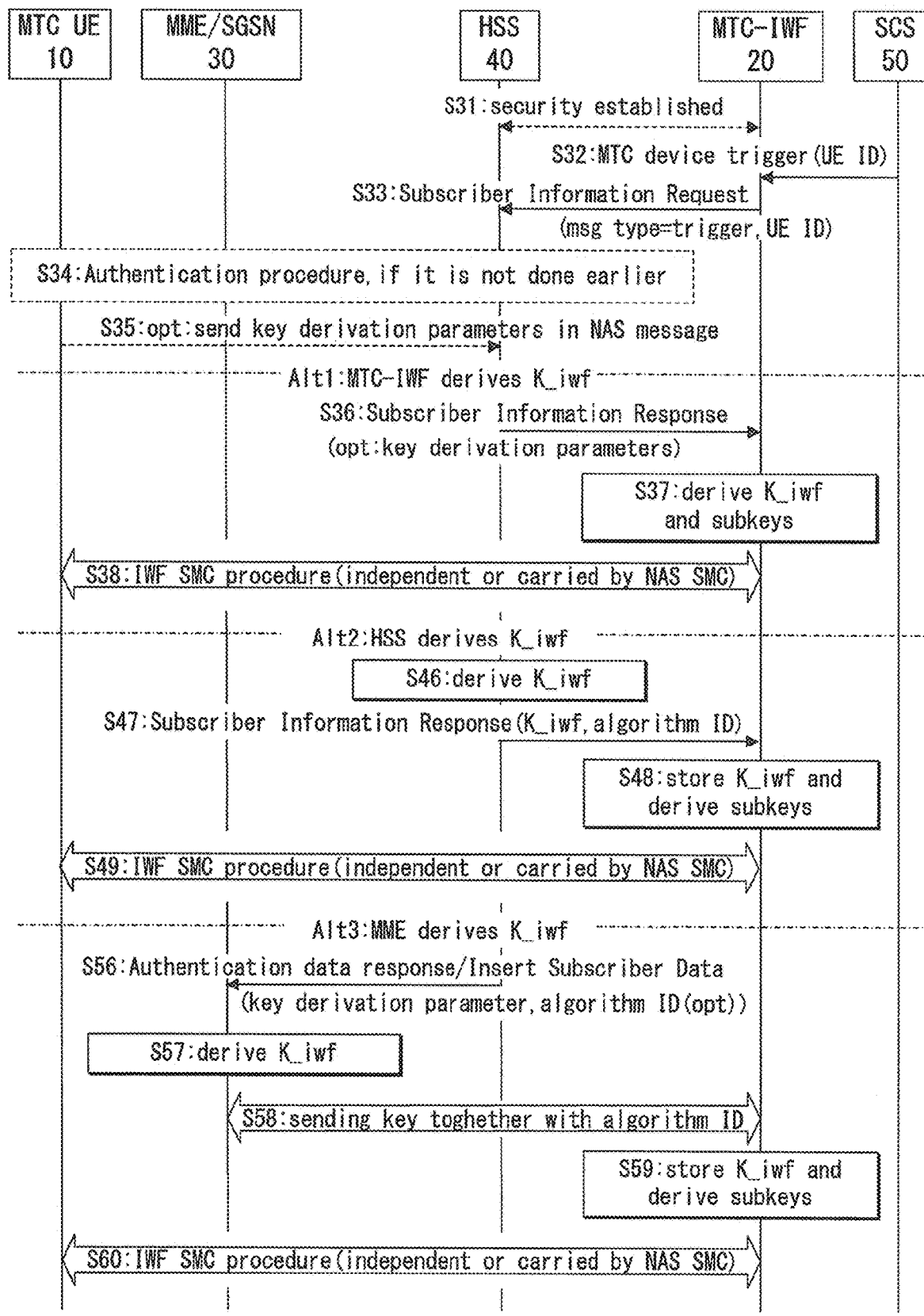
FIG. 4 is a sequence diagram showing an example of root key derivation at both UE and network in a case where communication is triggered by an SCS.
Figure 5:
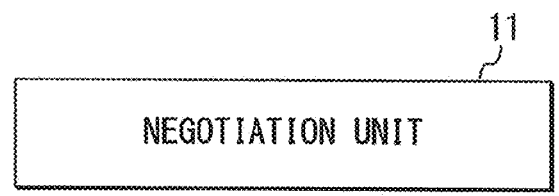
FIG. 5 is a block diagram showing a configuration example of an MTC device according to the exemplary embodiment.

As shown in FIG. 5, the MTC UE 10 includes a negotiation unit 11 which negotiates with the MTC-IWF 20 to establish the security association with the MTC UE 10 and the MTC-IWF 20 as shown in FIGS. 2 to 4. The negotiation unit 11 can transfer messages for the negotiation to the MTC-IWF 20 thorough the MME 30 as shown in FIG. 3. The negotiation unit 11 can send the key derivation parameters to the core network as shown at Step S35 in FIG. 4. The negotiation unit 11 can receive the algorithm ID from the MTC-IWF 20 as shown at Step S11 in FIG. 2. At the same Step S11, the negotiation unit 11 can further receive the key derivation parameters from the MTC-IWF 20. The negotiation unit 11 can derive the root key K_iwf and subkeys as shown at Step S12 in FIG. 2, and can verify the IWF SMC message received from the MTC-IWF 20 with the derived integrity subkey as shown at Step S13. As shown at Step S14, upon succeeding in the verification, the negotiation unit 11 protects the IWF SMC Complete message with the integrity subkey, and sends the protected IWF SMC Complete message to the MTC-IWF 20. Upon failing in the verification, the negotiation unit 11 sends the IWF SMC Reject message to the MTC-IWF 20. This negotiation unit 11 can be configured by, for example, a transceiver which conducts communication with the MTC-IWF 20 through the MME 30 and the RAN, a controller such as a CPU (Central Processing Unit) which controls this transceiver.

Figure 6:
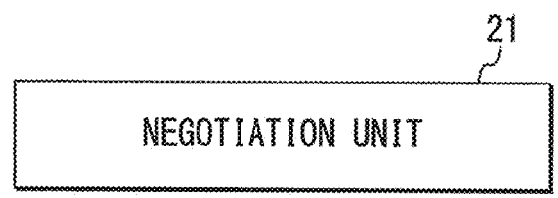
FIG. 6 is a block diagram showing a configuration example of a network node according to the exemplary embodiment.

As shown in FIG. 6, the MTC-IWF 20 includes a negotiation unit 21 which negotiates with the MTC UE 10 to establish the security association with the MTC UE 10 and the MTC-IWF 20 as shown in FIGS. 2 to 4. The negotiation unit 21 can transfer messages for the negotiation to the MTC UE 10 thorough the MME 30 as shown in FIG. 3. The negotiation unit 21 can send the algorithm ID to the MTC UE 10 as shown at Step S11 in FIG. 2. At the same Step S11, the negotiation unit 21 can further send the key derivation parameters to the MTC UE 10. The negotiation unit 21 can protect the IWF SMC message with the integrity subkey. The negotiation unit 21 can verify the IWF SMC Complete message received from the MTC UE 10 with the integrity subkey as shown at Step S15 in FIG. 2. This negotiation unit 21 can be configured by, for example, a transceiver which conducts communication with the MTC UE 10 through the MME 30 and the RAN, a controller such as a CPU which controls this transceiver.

Based on the above description, solutions will be proposed to 3GPP TR 33.868 as follows.

1. DISCUSSION

In MTC device triggering, application security between SCS and UE can protect trigger with confidentiality and integrity protection from eavesdropping or alteration.

However, since the communication for trigger delivery happens via mobile network, when we consider the security issues that the (unauthorized) triggering from SCS can bring, we also need to study the attacks to the network and the UEs attached to it. As described in threats section of TR 33.868, section 5.1.2, the attacks can cause UE power consumption, DoS attack to network, waste of network resources, overload NAS, and privacy issues. Since application security cannot solve these issues, security at transport and network layer should be considered.

In the existing system at NAS layer, MME and UE can establish NAS security. The trigger forwarded from MME to UE can have NAS security protection but MME was not designed for MTC purposed such that it does not perform any verification of SCS or the trigger from it. MME forwards any trigger it receives, which makes NAS security insufficient. Meanwhile, hop-by-hop security among MTC-IWF, MME and UE requires MME performing encryption/decryption, integrity check on both direction with MTC-IWF and UE when each trigger and response is received. The large amount of communication between UE and SCS will overload MME and NAS layer communication.

MTC-IWF, as the entrance element in the 3GPP network domain, authorizes SCS and its trigger request to a given UE, with support from HSS. MTC-IWF retrieves subscriber information and forwards the trigger from SCS to UE.

However, the security over interface T5 has not been studied. MitM attack can happen over the interface for a roaming UE. On top of that, a compromised MTC-IWF can replay, discard or alter the trigger message. The UE, which is mutually authenticated to MME and HSS and has NAS security context established with MME, trusts messages received from MME. Thus a fake trigger will be easily delivered to UE since MME does not perform any verification.

Therefore, it is necessary that UE and MTC-IWF have mutual authentication; message integrity, authentication, authorization, confidentiality protection, replay protection. MTC-IWF should ensure the security of trigger delivery, provide the proof when SCS is authenticated and authorized to the network.

2. PROPOSAL

We propose a new key hierarchy for UE and MTC-IWF to protect the communication between them, and present how the keys are derived and shared between the two ends, key management and also the extension to mobility case.

Communication between UE and MTC-IWF should have confidentiality and integrity protection using the subkeys.

2.1 New Key Hierarchy

The key hierarchy constitutes of a root key and a pair of confidentiality and integrity protection subkeys. Using a pair of subkeys makes it easy to perform key management. When the subkeys are expired or exposed, UE and MTC-IWF can simply derive another pair of subkeys from the root key they hold, instead of going all over again for key derivation and allocation.

K_IWF is a root key that should be shared only between UE and MTC-IWF. It is used to derive a pair of subkeys K_IWFe and K_IWFi at UE and MTC-IWF separately. K_IWFe is the confidentiality key and K_IWFi is the integrity key. The two subkeys are used for protecting the control plane communication between UE and MTC-IWF.

2.2 Key Derivation at Both Network and UE

We propose in this document that the same root key K_IWF is derived independently at both MTC-IWF and UE.

HSS send Kasme to MTC-IWF over interface S6m, and MTC-IWF derives the root key K_IWF from Kasme. The K_IWF should be stored in MTC-IWF and used for subkeys derivation.

Deriving the same key at different ends requires UE and MTC-IWF have the same seed and parameters and use the same algorithm. Necessary parameters for key derivation and algorithm identifier can be indicated by HSS to UE. We propose a IWF SMC procedure, using the NAS SMC mechanism [TS33.401].

After MTC-IWF derived subkeys from the root key, it indicates the parameters and algorithms to UE in the IWF SMC message. The message is integrity protected with integrity subkey K_IWFi.

In the same way as NAS SMC procedure, the UE should verify the integrity of the IWF security mode command message. If successfully verified, UE should start uplink confidentiality and integrity security protection. UE sends the IWF security mode complete message to MTC-IWF with integrity protection by using the integrity subkey K_IWFi it derived.

The MTC-IWF should check the integrity protection on the IWF Security Mode Complete message using K_IWFi. The downlink ciphering at the MTC-IWF with the subkeys can start after receiving the IWF Security mode complete message. The uplink deciphering at the MTC-IWF with the subkeys can start after sending the IWF security mode command message.

If any verification of the IWF security mode command is not successful in the UE, the UE should reply with a IWF security mode reject message.

The IWF SMC procedure can be an independent procedure or carried in NAS SMC procedure, with the full message or necessary parameters only.

2.3 Key Management 2.3.1 Root Key Derivation and Renew

For root key K_IWF derivation, the same Key derivation function (KDF) for LTE/SAE key derivation [TS33.401] is used.

Root key should be renewed when a new Kasme is derived and sent to MTC-IWF. For handover between MMEs, there is no need to renew root key. For handover between MTC-IWF, a new root key should be derived.

2.3.2 Subkey Derivation

The subkeys K_IWFe and K_IWFi should be derived once after the root key is derived. The subkeys derivation also uses the same KDF, with K_IWF as input key. The truncation procedure as described in [TS33.401] can be used to obtain the subkeys K_IWFe and K_IWFi. Other input parameters include: counter, length of counter.

K_IWFe is a key, which shall only be used for the protection of traffic between UE and MTC-IWF with a particular encryption algorithm.

K_IWFi is a key, which shall only be used for the protection of traffic between UE and MTC-IWF with a particular integrity algorithm.

When there is a new root key derived, new subkeys should be derived from the new root key. Network can decide to derive new subkeys from the same root key according to its policy at any time.

Note that the present invention is not limited to the above-mentioned exemplary embodiment, and it is obvious that various modifications can be made by those of ordinary skill in the art based on the recitation of the claims.

The whole or part of the exemplary embodiment disclosed above can be described as, but not limited to, the following supplementary notes.

(Supplementary Note 1)

New IWF SMC procedure for establishing security association between UE and MTC-IWF.

(Supplementary Note 2)

Modification of NAS SMC to carry messages of IWF SMC.

(Supplementary Note 3)

MTC-IWF sends key derivation parameters (optional) and algorithm ID to UE in the IWF SMC message.

(Supplementary Note 4)

IWF SMC message is protected by integrity subkey.

(Supplementary Note 5)

UE derives K_iwf and subkeys, verify the received IWF SMC message with the derived integrity subkey.

(Supplementary Note 6)

UE sends IWF SMC Complete message to MTC-IWF, integrity protects the message with the integrity subkey UE has derived.

(Supplementary Note 7)

MTC-IWF performs integrity verification of IWF SMC Complete with the integrity subkey it derived.

(Supplementary Note 8)

UE sends IWF SMC Reject message if the verification fails.

(Supplementary Note 9)

MTC-IWF indicates to HSS that the SCS initiated communication to a given UE, with msg type=trigger and UE ID inserted in the Subscriber Information Request.

(Supplementary Note 10)
  Root key derivation parameter provision:
  1) UE sends root key K_iwf derivation parameters in NAS message to network.
  2) HSS sends K_iwf derivation parameters to MTC-IWF, by re-using Subscriber Information Response message or a new message of Update Subscriber Information.
  3) MTC-IWF sends K_iwf derivation parameters to HSS, for example in Subscriber Information Request message.
(Supplementary Note 11)
  HSS or MME sends MTC-IWF the algorithm ID that they used to derive K_iwf.
(Supplementary Note 12)
  HSS sends key derivation parameters and algorithm ID (optional) to MME.
(Supplementary Note 21)
  A communication system comprising:
  an MTC (Machine-Type-Communication) device; and
  a network relaying traffic between the MTC device and a server that can communicate with the MTC device,
  wherein the network includes a first node that serves as a gateway to the network for the server, and
  the first node negotiates with the MTC device to establish security association between the MTC device and the first node itself.
(Supplementary Note 22)
  The communication system according to Supplementary note 21,
  wherein the network further includes a second node that can establish confidentiality and integrity protected connection with the MTC device, and
  the first node and the MTC device transfer messages for the negotiation through the second node.
(Supplementary Note 23)
  The communication system according to Supplementary note 22,
  wherein the MTC device sends, to the network that can be confidential and integrity protected, parameters for the network to derive a root key, and
  the root key is used for deriving at least a subkey to check the integrity of messages transferred between the MTC device and the first node.
(Supplementary Note 24)
  The communication system according to Supplementary note 21 or 22,
  wherein the first node sends an algorithm identifier to the MTC device,
  the algorithm identifier instructs the MTC device to select one of algorithms for deriving a root key, and
  the root key is used for deriving at least a subkey to check the integrity of messages transferred between the MTC device and the first node.
(Supplementary Note 25)
  The communication system according to Supplementary note 24, wherein the first node further sends, to the MTC device, parameters for the MTC device to derive the root key.
(Supplementary Note 26)
  The communication system according to Supplementary note 24 or 25, wherein the first node protects the message with the subkey.
(Supplementary Note 27)
  The communication system according to Supplementary note 26, wherein the MTC device derives the root key and the subkey, and verifies the message with the derived subkey.
(Supplementary Note 28)
  The communication system according to Supplementary note 27,
  wherein upon succeeding in the verification, the MTC device sends to the first node a response message indicating the success, and
  the MTC device protects the response message with the derived subkey upon sending the response message.
(Supplementary Note 29)
  The communication system according to Supplementary note 28, wherein the first node verifies the response message with the subkey.
(Supplementary Note 30)
  The communication system according to any one of Supplementary notes 27 to 29, wherein upon failing in the verification, the MTC device sends to the first node a response message indicating the failure.
(Supplementary Note 31)
  A node that is included in a network relaying traffic between an MTC device and a server being able to communicate with the MTC device, and that serves as a gateway to the network for the server, the node comprising:
  negotiation means for negotiating with the MTC device to establish security association between the MTC device and the node itself.
(Supplementary Note 32)
  The node according to Supplementary note 31, wherein the negotiation means is configured to transfer messages for the negotiation to the MTC device through a different node that is included in the network and that can establish confidentiality and integrity protected connection with the MTC device.
(Supplementary Note 33)
  The node according to Supplementary note 31 or 32, wherein the negotiation means is configured to send an algorithm identifier to the MTC device, the algorithm identifier instructing the MTC device to select one of algorithms for deriving a root key, the root key being used for deriving at least a subkey to check the integrity of messages transferred between the MTC device and the node.
(Supplementary Note 34)
  The node according to Supplementary note 33, wherein the negotiation means is configured to further send, to the MTC device, parameters for the MTC device to derive the root key.
(Supplementary Note 35)
  The node according to Supplementary note 33 or 34, wherein the negotiation means is configured to protect the message with the subkey.
(Supplementary Note 36)
  The node according to Supplementary note 35,
  wherein the MTC device derives the root key and the subkey, verifies the message with the derived subkey, and upon succeeding in the verification, sends to the node a response message indicating the success, the response message being protected with the derived subkey,
  wherein the negotiation means is configured to verify the response message with the subkey.
(Supplementary Note 37)
  The node according to any one of Supplementary notes 31 to 36, comprising an MTC-IWF (MTC Inter-Working Function).
(Supplementary Note 38)
  An MTC device that communicates with a server through a network relaying traffic between the MTC device and the server, the MTC device comprising:
  negotiation means for negotiating, with a first node that is included in the network and that serves as a gateway to the network for the server, to establish security association between the MTC device and the node.

(Supplementary Note 39)

The MTC device according to Supplementary note 38, wherein the negotiation means is configured to transfer messages for the negotiation to the first node through a second node that is included in the network and that can establish confidentiality and integrity protected connection with the MTC device.

(Supplementary Note 40)

The MTC device according to Supplementary note 39, wherein the negotiation means is configured to send, to the network that can be confidential and integrity protected, parameters for the network to derive a root key, the root key being used for deriving at least a subkey to check the integrity of messages transferred between the MTC device and the first node.

(Supplementary Note 41)

The MTC device according to Supplementary note 38 or 39, wherein the negotiation means is configured to receive an algorithm identifier from the first node, the algorithm identifier instructing the MTC device to select one of algorithms for deriving a root key, the root key being used for deriving at least a subkey to check the integrity of messages transferred between the MTC device and the first node.

(Supplementary Note 42)

The MTC device according to Supplementary note 41, wherein the negotiation means is configured to further receive, from the first node, parameters for the MTC device to derive the root key.

(Supplementary Note 43)

The MTC device according to Supplementary note 41 or 42, wherein the first node protects the message with the subkey, wherein the negotiation means is configured to derives the root key and the subkey, and to verify the message with the derived subkey.

(Supplementary Note 44)

The MTC device according to Supplementary note 43, wherein upon succeeding in the verification, the negotiation means is configured to:

protect, with the derived subkey, a response message indicating the success; and send the response message to the first node.

(Supplementary Note 45)

The MTC device according to Supplementary note 43 or 44, wherein upon failing in the verification, the negotiation means is configured to send to the first node a response message indicating the failure.

(Supplementary Note 46)

A method of controlling operations in a node that is included in a network relaying traffic between an MTC device and a server being able to communicate with the MTC device, and that serves as a gateway to the network for the server, the method comprising:

negotiating with the MTC device to establish security association between the MTC device and the node.

(Supplementary Note 47)

A method of controlling operations in an MTC device that communicates with a server through a network relaying traffic between the MTC device and the server, the method comprising:

negotiating, with a first node that is included in the network and that serves as a gateway to the network for the server, to establish security association between the MTC device and the node.

This application is based upon and claims the benefit of priority from Japanese patent application No. 2013-002981, filed on Jan. 10, 2013, the disclosure of which is incorporated herein in its entirety by reference.

REFERENCE SIGNS LIST

10 MTC UE
11, 21 NEGOTIATION UNIT
20 MTC-IWF
30 MME/SGSN
40 HSS
50 SCS

The invention claimed is:

1. A User Equipment (UE) in a mobile communication system including a Mobility Management Entity (MME), a network server, a network node that differs from the MME, and a Home Subscriber Server (HSS), the UE comprising:
  at least one processor; and
  at least one memory coupled to the at least one processor, the at least one memory storing instructions that when executed by the at least one processor cause the at least one processor to:
   perform first communication with the network node by receiving a first message including first security information from the network node, when the network node receives a second message from the network server and derives a first key, a second key, and a third key based on second security information received from the HSS,
   derive a fourth key same as the first key, a fifth key same as the second key, and a sixth key same as the third key with the network node based on the first security information,
   protect the first communication using first confidential protection based on the fifth key and first integrity protection based on the sixth key,
   perform second communication with the network server using the first communication, and
   protect the second communication using second confidential protection and second integrity protection.

2. The UE of claim 1, wherein the first security information includes a key derivation parameter and an algorithm ID.

3. The UE of claim 1, wherein the UE is a Machine Type Communication (MTC) device.

4. A method of a User Equipment (UE) in a mobile communication system including a Mobility Management Entity (MME), a network server, a network node that differs from the MME, and a Home Subscriber Server (HSS), the method comprising:
  performing first communication with the network node by receiving a first message including first security information from the network node, when the network node receives a second message from the network server and derives a first key, a second key, and a third key based on second security information received from the HSS;
  deriving a fourth key same as the first key, a fifth key same as the second key, and a sixth key same as the third key with the network node based on the first security information;

protecting the first communication using first confidential protection based on the fifth key and first integrity protection based on the sixth key;
performing second communication with the network server using the first communication; and
protecting the second communication using second confidential protection and second integrity protection.

5. The method of claim 4, wherein the first security information includes a key derivation parameter and an algorithm ID.

6. The method of claim 4, wherein the UE is an Machine Type Communication (MTC) device.

7. A network node in a mobile communication system including a User Equipment (UE), a Mobility Management Entity (MME) that differs from the network node, a network server, and a Home Subscriber Server (HSS), the network node comprising:
  at least one processor; and
  at least one memory coupled to the at least one processor, the at least one memory storing instructions that when executed by the at least one processor cause the at least one processor to:
    receive a second message from the network server,
    receive second security information from the HSS,
    derive a first key, a second key and a third key based on the second security information,
    perform first communication with the UE by sending a first message including first security information to the UE, the UE deriving a fourth key same as the first key, a fifth key same as the second key, and a sixth key same as the third key with the network node based on the first security information, and
    protect the first communication using first confidential protection based on the fifth key and first integrity protection based on the sixth key,
    wherein the UE performs second communication with the network server using the first communication and protects the second communication using second confidential protection and second integrity protection.

8. The network node of claim 7, wherein the first security information includes a key derivation parameter and an algorithm ID.

9. The network node of claim 7, wherein the UE is a Machine Type Communication (MTC) device.

10. A method of a network node in a mobile communication system including a User Equipment (UE), a Mobility Management Entity (MME) that differs from the network node, a network server, and a Home Subscriber Server (HSS), the method comprising:
  receiving a second message from the network server;
  receiving second security information from the HSS;
  deriving a first key, a second key and a third key based on the second security information;
  performing first communication with the UE by sending a first message including first security information to the UE, the UE deriving a fourth key same as the first key, a fifth key same as the second key, and a sixth key same as the third key with the network node based on the first security information; and
  protecting the first communication using first confidential protection based on the fifth key and first integrity protection based on the sixth key,
  wherein the UE performs second communication with the network server using the first communication and protects the second communication using second confidential protection and second integrity protection.

11. The method of claim 10, wherein the first security information includes a key derivation parameter and an algorithm ID.

12. The method of claim 10, wherein the UE is a Machine Type Communication (MTC) device.

* * * * *